March 5, 1968 A. M. HALL 3,371,737
CONTROLLED HEIGHT AERODYNAMIC AND HYDRODYNAMIC
BAFFLES FOR AIR CUSHIONED VEHICLES
Filed Oct. 1, 1964 3 Sheets-Sheet 1

INVENTOR
ARNOLD M. HALL
BY Semmes & Semmes
ATTORNEYS

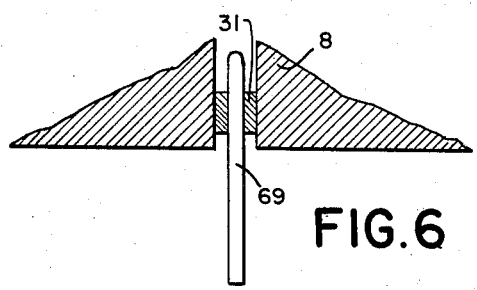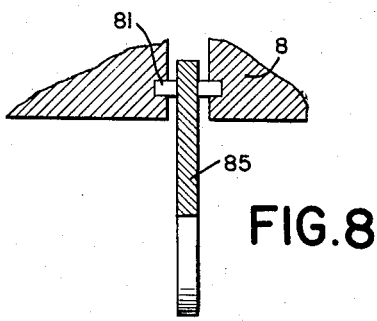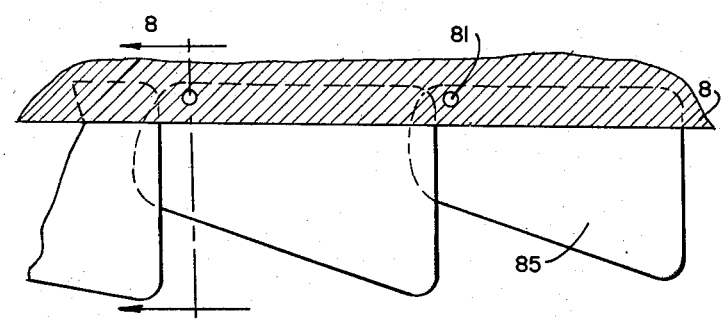

March 5, 1968  A. M. HALL  3,371,737
CONTROLLED HEIGHT AERODYNAMIC AND HYDRODYNAMIC
BAFFLES FOR AIR CUSHIONED VEHICLES
Filed Oct. 1, 1964  3 Sheets-Sheet 3

INVENTOR
ARNOLD M. HALL
BY *Semmes & Semmes*
ATTORNEYS

United States Patent Office 3,371,737
Patented Mar. 5, 1968

3,371,737
CONTROLLED HEIGHT AERODYNAMIC AND HYDRODYNAMIC BAFFLES FOR AIR CUSHIONED VEHICLES
Arnold M. Hall, Noank, Conn., assignor to General Dynamics Corporation, New York, N.Y., a corporation of Delaware
Filed Oct. 1, 1964, Ser. No. 400,664
10 Claims. (Cl. 180—117)

This invention concerns apparatus for laterally confining the fluid cushion of a fluid levitated vehicle, selectively. Described herein are baffles used to divide the fluid cushion, in order that pressures within the cushion may be varied to provide roll and pitch stability.

This case is related to my co-pending application Ser. No. 391,605 filed Aug. 24, 1964, entitled, Air Cushion Sealing Appendages for Air Cushion Devices and since abandoned.

Air cushion vehicles are under development to provide dependable vehicles having advanced operating characteristics. Usefulness and general acceptance of air levitated devices depends in part upon their stability which can best be provided by control of air cushions. Means used to confine and divide a "cushion" must have good aerodynamic, hydrodynamic and ground and water impact characteristics as well as low operating power requirements.

To provide a practical degree of roll and pitch stability in air cushion vehicles, the air cushion is conventionally vertically separated into several zones, each containing a portion of a cushion. Fluid jet sheets have been used to divide an air cushion.

Although excellent ground traversing properties are inherent in fluid jets, conventional methods of producing jets require great power. Simple mechanical baffles or rigid dividers have been suggested to replace fluid jet sheets. Simple vertical baffles require no power to divide the air cushion, but they have limited ground or wave impact properties. Moreover, rigid baffles generally would engender high aerodynamic and hydrodynamic drag losses.

This invention overcomes the inherent high power requirements of jet sheets, and the disadvantageous impact and drag qualities of simple mechanical baffles. Herein disclosed are flexible baffles having means to extend the baffles only so far as necessary for required pitch and roll control. In preferred form the novel baffles comprise a rigidized lower portion extended from the vehicle, an inflated body offering excellent ground engaging qualities with no power requirement.

Accordingly, it is an object of this invention to provide lateral control of air cushions with baffles requiring minimal power and having excellent aerodynamic, hydrodynamic and impact properties.

It is also an object of this invention to provide directional stability and control of air cushion vehicles by lateral hydrodynamic resistance of fully extended baffles.

Another object of invention is the provision in such craft of light weight but strong baffles, which also are retractable.

The provision of baffle retracting means in craft which provide high impact resistance is a further objective of the invention.

Another object is the providing of baffles having rigid ground and water impacting surfaces and flexible connections to craft.

Still another object of the invention is the provision in vehicles of baffles for use in conjunction with jet sheets to obtain maximum operating effect from the sheets, per se.

Another object is to provide a baffle which, when supported in more or less rigid manner through the stiffness afforded by being inflated, also acts as a hydrodynamic skeg or keel for improved control and maneuvering over water.

Further objects of invention will be apparent from the drawings, in which:

FIGURE 6 is a cross-section of a flexible, translatable baffle;

FIGURE 7 is an elevation of plurality of pivoted baffles;

FIGURE 8 is a cross-section taken along line 8—8 of FIGURE 7;

FIGURES 9 through 13 are views of several suggested forms of baffles' lower extremities;

Figure 16:
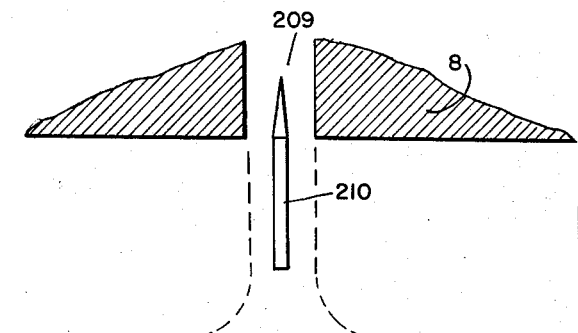
Figures 17, 18:
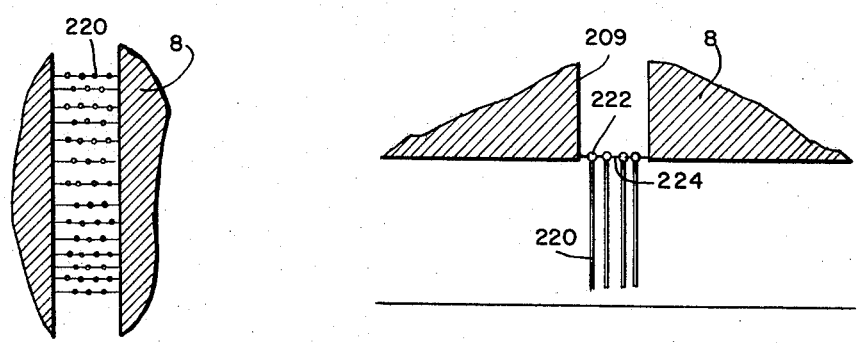

FIGURE 16 presents the use of flexible baffles in conjunction with an air jet sheet;

FIGURE 17 suggests a plurality of rods hanging within the jet sheet;

FIGURE 18 is a plan view of the divider shown in FIGURE 17.

Figure 1:
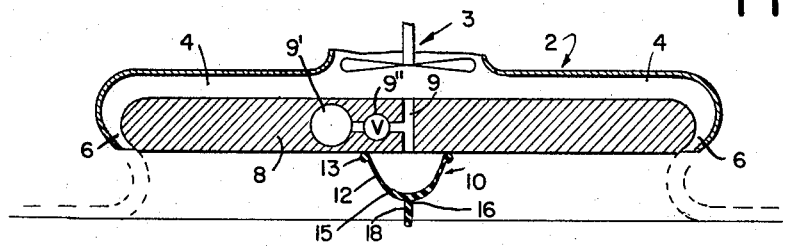
FIGURE 1 is a schematic representation of an air cushion vehicle, on which a preferred baffle has been centrally mounted.

In FIGURE 1, an air cushion vehicle is schematically represented by the numeral 2. A turbo blower at numeral 3 supplies a pressurized fluid, usually air. The fluid is conducted through channels 4 and is exhausted from peripheral nozzles 6, forming an air cushion. Baffle 10 is mounted centrally on vehicle 8 so that air cushion pressures on opposite sides of the baffle may be varied to effect roll control. Rigidized lower portion 18 of baffle 10 is integrally connected to side 15 of inflated pod 12. The pod in turn is secured at 13 to the underside of vehicle 8. Fluid conduit 9 leads from a source 9′ of pressurized gas, usually air, into inflatable pod 12. Controlling the pressure in pod 12 by means of control member 9″, and varying its pressure from that of the air cushion, orders the stiffness of the baffle. Impacts taken by skeg or lower portion 18 are absorbed by the inflated pod 12. Pod 12 and other inflated bodies disclosed herein may be constructed in compartments as shown in my co-pending application Ser. No. 391,605.

Figure 2:
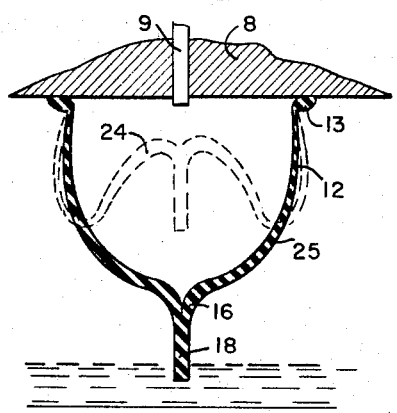
FIGURE 2 is an enlarged view of the baffle shown in FIGURE 1, illustrating in phantom view the normal, collapsed position of the inflated pod.

The phantom lines in FIGURE 2 represent the normal deflated position of pod 12, when its internal pressure is reduced. Upon application of pressure through conduit 9, re-entrant wall 24 assumes convex shape 25 urging skeg 18 away from vehicle 8. Further increasing pressure within pod 12 results in its increased stiffness.

Figure 3:
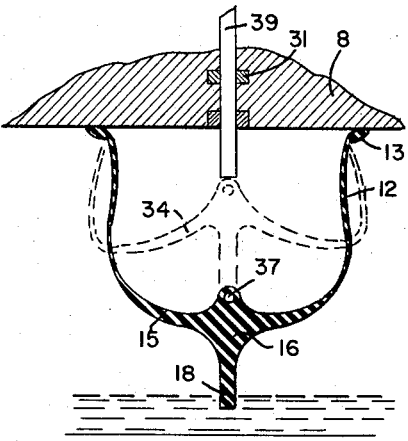
FIGURE 3 illustrates a baffle operated by an extensible actuator.

In FIGURE 3 pod 12 is of a lighter construction, since actuator 39 may withdraw the baffle. A pin in aperture 37 secures the throat area 16 of baffle to the vertical actuator 39 which is selectively positioned. Although lower portion 18 may yieldably rotate about pin 37, actuator 39 as well as inflation of pod 12 insure lateral stability of the baffle.

Figure 4:
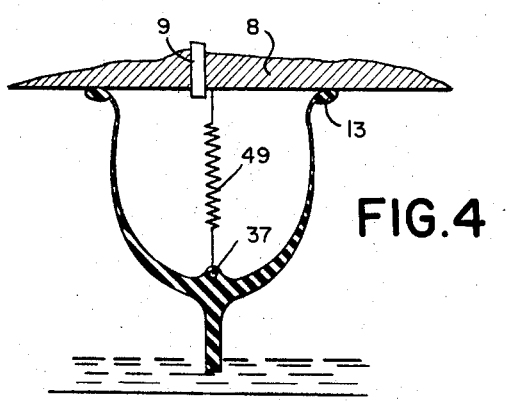
FIGURE 4 is a cross-sectional view of a baffle shown in FIGURE 1, which may be retracted by tension springs.
Figure 5:
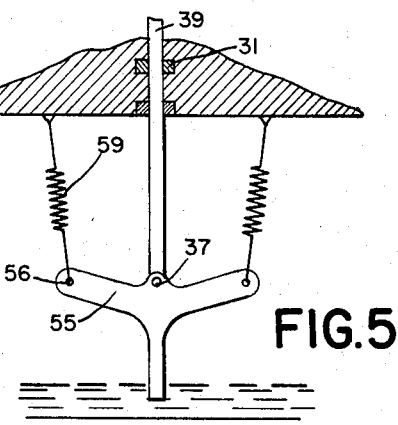
FIGURE 5 is a cross-section of a baffle similar to that shown in FIGURE 3, employing tension springs for flexibility.
Figure 14:
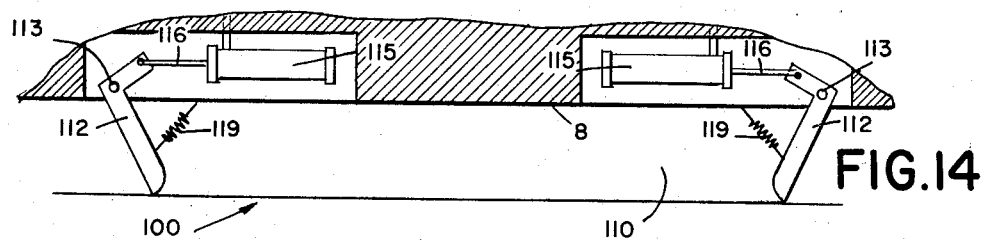
FIGURE 14 is a schematic elevation of a membraneous baffle stretched between levers.

In FIGURE 4, tension spring 49, secured to an aperture 37, elevates the baffle when air pressure from conduit 9 is reduced. This self-returning configuration of the baffle is similar to the pre-loaded configuration shown in FIGURE 2. FIGURE 5 discloses a T-shaped lower portion 55 of a baffle having a central aperture 37 pinned to actuator 39. Springs 59 automatically retract the baffle when reduced force is asserted thereon by the actuator. The springs and pin are complementary in promoting lateral flexibility of the baffle.

FIGURE 6 is the end view of a vertically translatable flexible baffle 69 which may be retracted through slide 31 into vehicle 8. Preferably this barrier is constructed of rubber or of a similar synthetic. A plurality of rotatable baffles are shown in FIGURES 7 and 8. Here, baffles 85 are controllably rotated about pin 81 into and out of vehicle 8. FIGURES 9 through 13 are suggested lower tips for baffles described in this specification. These tip constructions provide advantageous areodynamic flow between the water or ground and the baffle.

Figure 15:
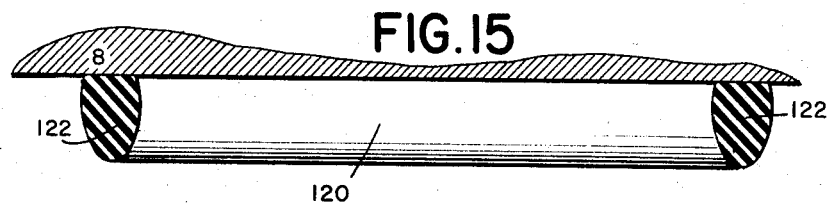
FIGURE 15 illustrates the use of a membraneous baffle similar to that shown in FIGURE 14, which is stretched between expanded bodies 122.

A third embodiment of the invention comprises longitudinal baffle 100 stretched between opposing struts. Flexible membrane 110 is drawn tight by levers 112. The latter typically are pivoted at 113 in vehicle 8. Connecting rods 116 join the pistons of single acting cylinders 115 with the upper ends of levers 112. Tension springs 119 oppose the actuators to elevate the baffle under diminished roll and pitch control requirements. In FIGURE 15, a membrane 120 is stretched between expanded homogenous bodies 122. In an alternate form, bodies 122 may be inflated, selectively controlling the height of the membrane.

FIGURE 16 represents the positioning of flexible baffles 210 directly in a jet nozzle 209. In this manner, the augmenting baffles increase the effectiveness of the jet. In FIGURES 17 and 18 numerous rods 220 are hung from support members 224 and jet nozzle 209. The effect of these rods is to enhance the jet sheet zone divider to obtain maximum efficiency from the power used.

Although the invention has been described by several embodiments, including extensible rigidized skegs, stretched membranes and jet associated baffles, it will be obvious to one skilled in the art that teachings of the specification may have varied applications. Therefore, the invention is not limited by specific embodiments disclosed herein; limits of the inventon are prescribed only in the appended claims.

I claims:

1. In an air levitated vehicle supported by a peripherally confined fluid cushion, the improvement comprising at least one laterally disposed baffle extending downwardly from said vehicle for lateral control of the fluid cushion, said baffle comprising a rigid lower portion and a flexible upper portion including an inflatable pod fixed to said vehicle and normally in a contracted position said pod being of trough configuration opening upwardly in a continuous edge secured to the vehicle and terminating downwardly in a surface adapted to contiguously join said rigid lower portion, a source of pressurized fluid and means to convey and regulate the amount of fluid introduced into said pod so as to control the lateral expansion of said pod as a control of pitch and roll, together with tension means compressing said pod and elevating said lower portion of said baffle upon reduction of pressure within said pod, said tension means being located entirely within said pod and operatively coupling the vehicle and the lower surface of said pod.

2. Apparatus of claim 1 wherein said tension means comprises at least one actuating rod mounted on a lower surface of said pod and extending into said vehicle, and means within the vehicle selectively vertically positioning said rod.

3. Apparatus of claim 1, wherein said rigid lower portion is uniform in cross-section.

4. Apparatus of claim 1, wherein said rigid lower portion terminates downwardly in a diverging bottom.

5. Apparatus of claim 1, wherein said rigid lower portion is generally uniform in cross-section and terminates in a transverse bottom member.

6. Apparatus of claim 1, wherein said rigid lower portion terminates in a generally two-pronged bottom.

7. Apparatus of claim 1, wherein said rigid lower portion terminates in a generally three-pronged bottom.

8. Apparatus of claim 1, wherein said rigid portion is a fin of pre-built flexibility.

9. Apparatus of claim 8, wherein said fin is laminate.

10. Apparatus of claim 8, wherein said fin is an inflated member.

References Cited

UNITED STATES PATENTS

| | | | |
|---|---|---|---|
| 685,829 | 11/1901 | Engelhardt | 114—140 |
| 1,061,826 | 5/1913 | Didlake | 114—140 |
| 1,395,000 | 10/1921 | McRae. | |
| 2,569,270 | 9/1951 | Wilson | 114—141 |
| 3,110,281 | 11/1963 | Buck | 114—141 |
| 3,172,494 | 3/1965 | Cockerell | 180—7 |
| 3,191,705 | 6/1965 | Jones et al. | |
| 3,205,847 | 9/1965 | Smith | 180—7 |
| 3,221,831 | 12/1965 | Weiland | 180—7 |
| 3,239,023 | 3/1966 | Jones | 180—7 |
| 3,240,282 | 3/1966 | Taylor | 180—7 |
| 3,291,241 | 12/1966 | Jones | 180—7 |

FOREIGN PATENTS

| | | |
|---|---|---|
| 1,344,575 | 10/1963 | France. |
| 1,006,493 | 10/1965 | Great Britain. |

A. HARRY LEVY, *Primary Examiner.*

BENJAMIN HERSH, *Examiner.*

M. SALES, *Assistant Examiner.*